(12) United States Patent
Partington et al.

(10) Patent No.: US 8,020,937 B2
(45) Date of Patent: Sep. 20, 2011

(54) LAYERED TECHNOLOGY FOR ENERGY MANAGEMENT OF VEHICLE SEATING

(75) Inventors: Eric Partington, Orion, MI (US); Ashford A. Galbreath, Troy, MI (US); Asad S. Ali, Troy, MI (US)

(73) Assignee: Lear Corporation, Southfield, MI (US)

( * ) Notice: Subject to any disclaimer, the term of this patent is extended or adjusted under 35 U.S.C. 154(b) by 402 days.

(21) Appl. No.: 12/183,770

(22) Filed: Jul. 31, 2008

(65) Prior Publication Data
US 2010/0026076 A1 Feb. 4, 2010

(51) Int. Cl.
*B60N 2/50* (2006.01)
*B62J 1/00* (2006.01)

(52) U.S. Cl. ......... 297/452.48; 297/195.12; 297/452.21; 5/652; 5/653; 5/655.9

(58) Field of Classification Search ............. 297/452.21, 297/452.23, 452.27, 452.48; 5/652, 653, 5/655.9
See application file for complete search history.

(56) References Cited

U.S. PATENT DOCUMENTS

| | | | | |
|---|---|---|---|---|
| 4,819,288 A | * | 4/1989 | Lowthian | .......................... 5/653 |
| 4,999,068 A | | 3/1991 | Chiarella | |
| 5,018,231 A | * | 5/1991 | Wang | .......................... 5/636 |
| 5,219,649 A | | 6/1993 | Nishino et al. | |
| 5,226,188 A | * | 7/1993 | Liou | .......................... 5/653 |
| 5,533,218 A | * | 7/1996 | Fahy | .......................... 5/636 |
| 5,544,942 A | * | 8/1996 | Vu Khac et al. | ......... 297/452.37 |
| 5,603,874 A | | 2/1997 | Ishii et al. | |
| 5,644,809 A | * | 7/1997 | Olson | .............................. 5/636 |
| 5,786,394 A | * | 7/1998 | Slaven | .............................. 521/51 |
| 6,671,907 B1 | * | 1/2004 | Zuberi | .............................. 5/636 |
| 6,739,655 B1 | | 5/2004 | Schwochert et al. | |
| 6,845,534 B1 | * | 1/2005 | Huang | .......................... 297/397 |
| 7,585,030 B2 | * | 9/2009 | Galbreath et al. | ....... 297/452.27 |
| 2007/0236072 A1 | * | 10/2007 | Galbreath et al. | ....... 297/452.27 |

FOREIGN PATENT DOCUMENTS

| | | |
|---|---|---|
| CH | 441003 C | 7/1967 |
| DE | 865956 C | 2/1953 |
| DE | 1099864 B | 2/1961 |
| DE | 4401665 A1 | 7/1995 |
| GB | 752215 C | 7/1956 |

OTHER PUBLICATIONS

German Patent and Trademark Office, Office Action for the corresponding German Patent Application No. 10 2009 033 290.1 mailed Oct. 7, 2010.

\* cited by examiner

*Primary Examiner* — Peter R. Brown
(74) *Attorney, Agent, or Firm* — Brooks Kushman P.C.

(57) ABSTRACT

A vehicle seat assembly having a cushion composite attachable to a vehicle. The cushion composite has a structural layer of an expanded polymer and a cushion layer adjacent the structural layer. A trim material covers the cushion composite. The structural layer is proximate the vehicle when the cushion composite is attached to the vehicle. A surface of the structural layer defines a cavity extending into the structural layer. An opening of the cavity is disposed proximate the vehicle when the cushion composite is attached to the vehicle. The cavity is configured to facilitate flexure of the structural layer when a force is applied to the structural layer.

1 Claim, 3 Drawing Sheets

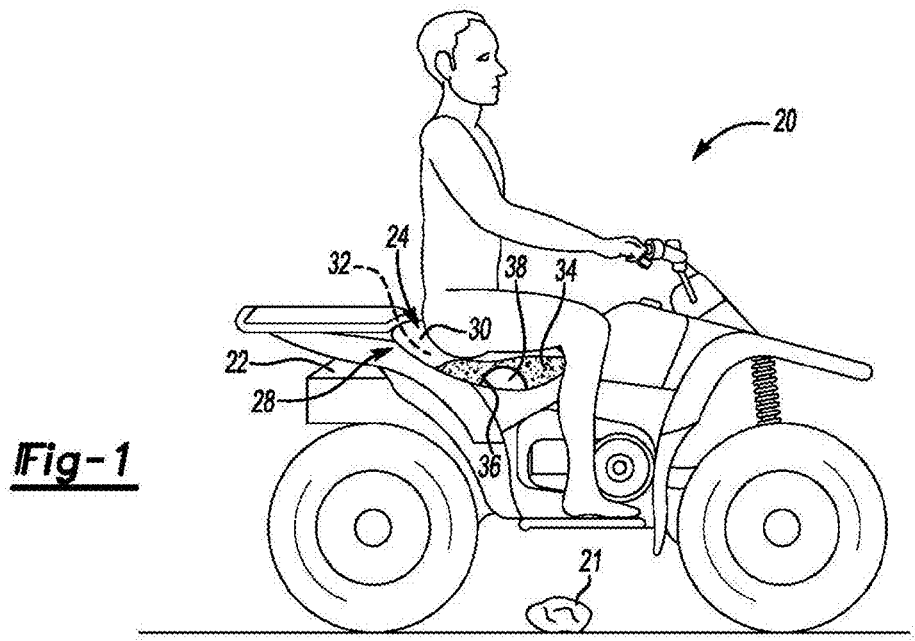
_Fig-1_
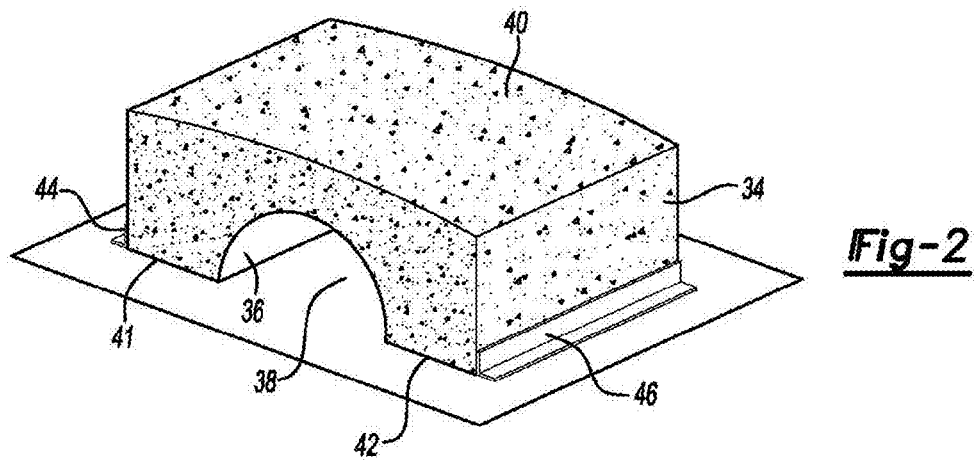
_Fig-2_
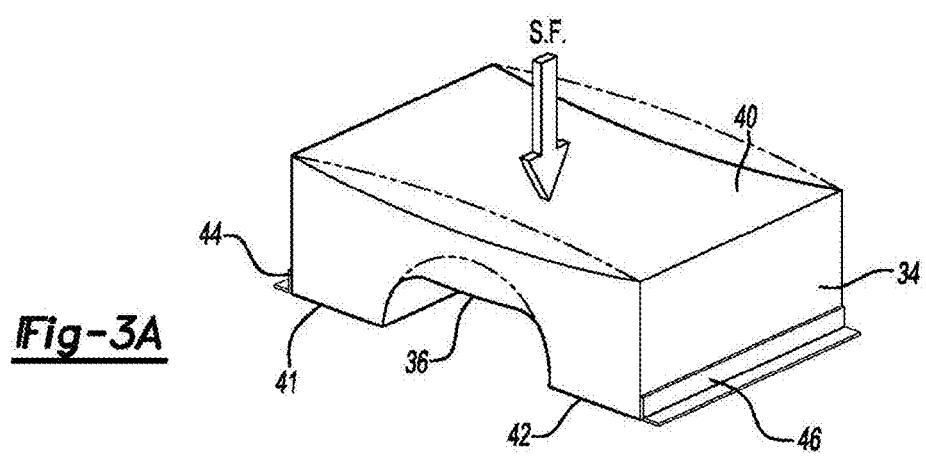
_Fig-3A_

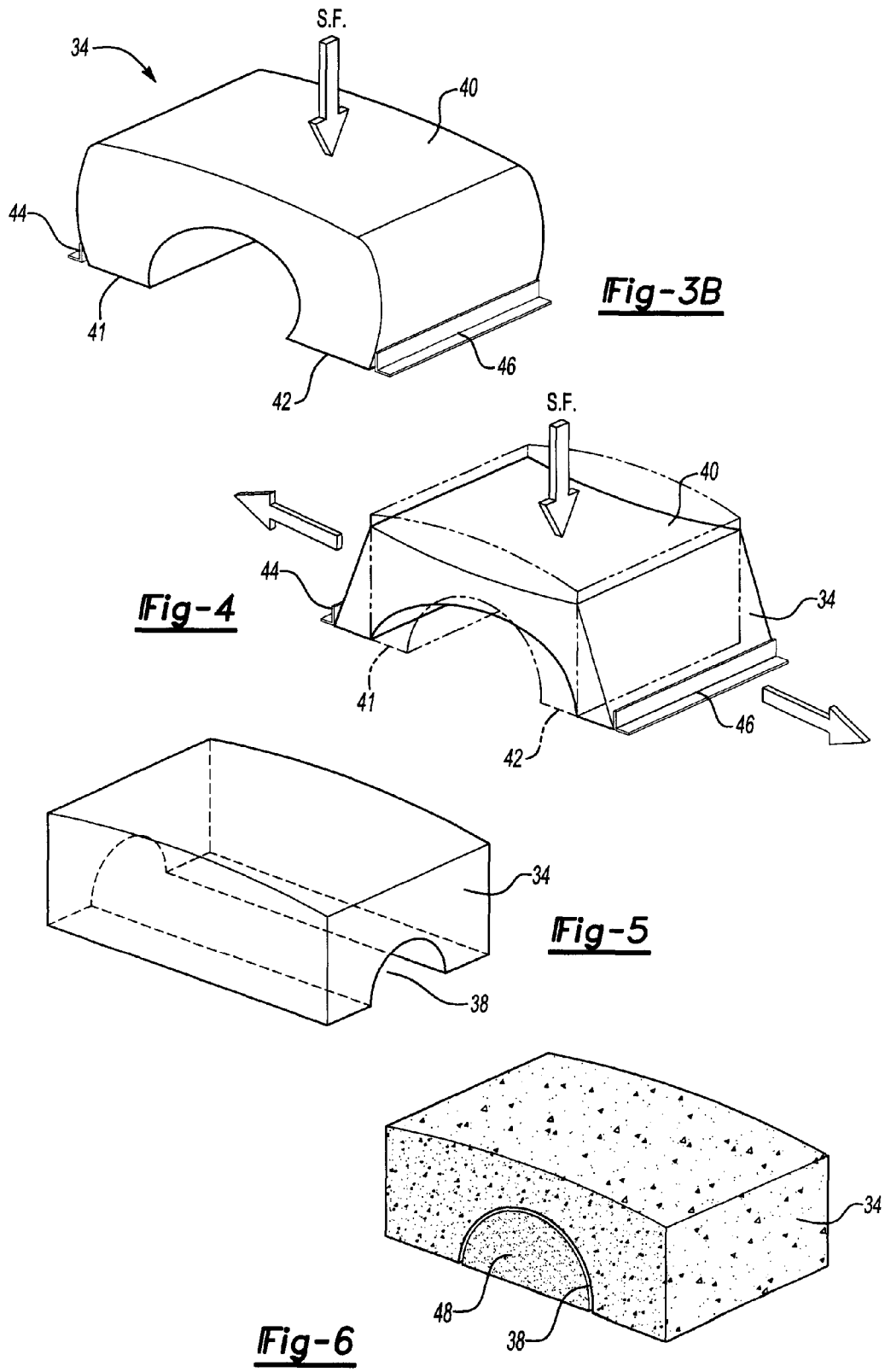

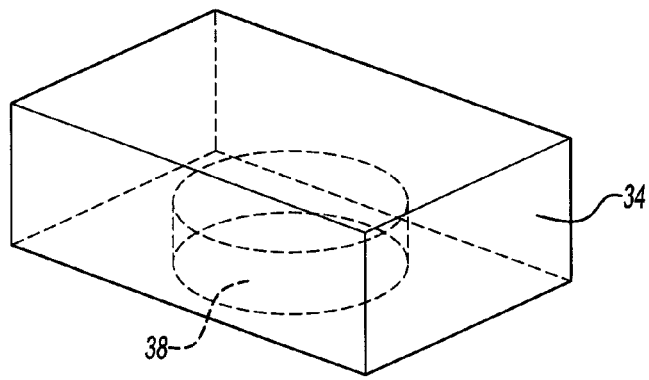
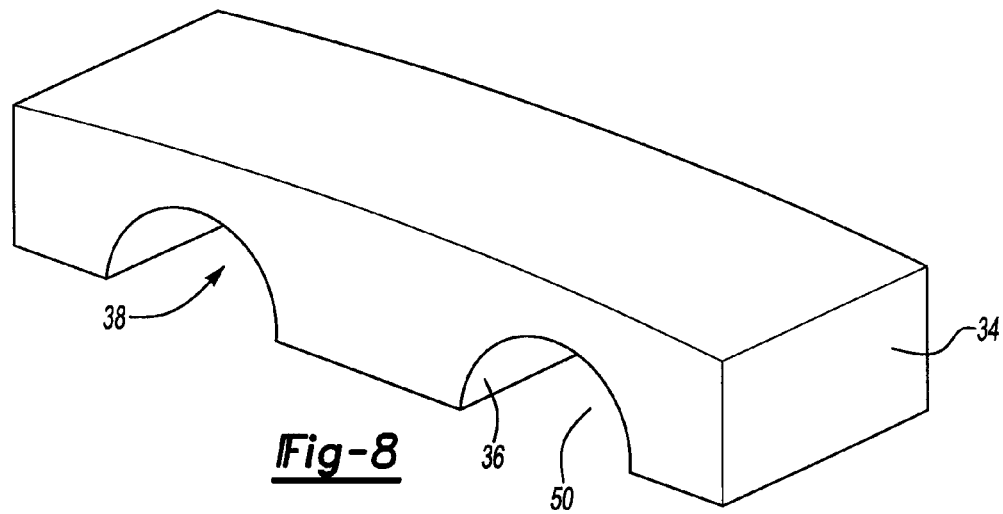
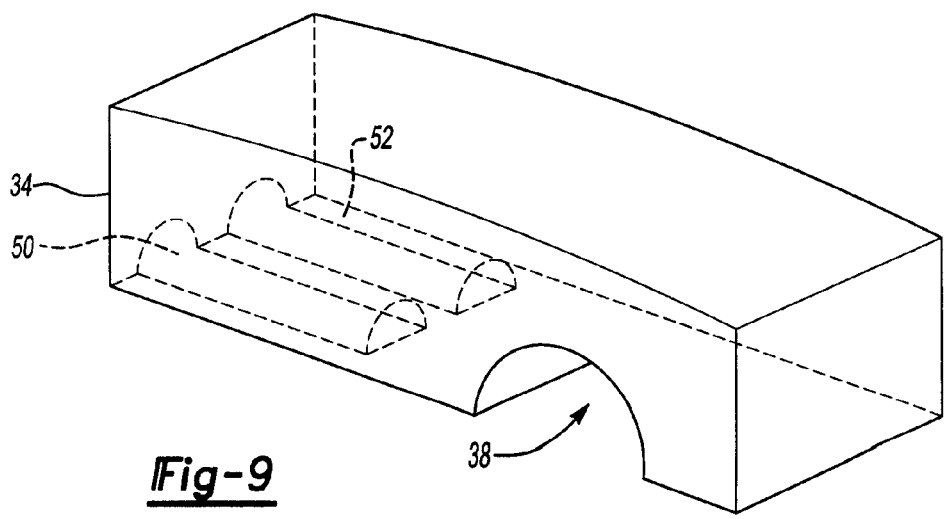

LAYERED TECHNOLOGY FOR ENERGY MANAGEMENT OF VEHICLE SEATING

BACKGROUND OF THE INVENTION

1. Field of the Invention

Embodiments of the present invention relate to vehicle seat assemblies having a structural layer comprising an expanded polymer, wherein a cavity extends partially into the structural layer to facilitate flexure of the structural layer in response to an applied force.

2. Background Art

Vehicles occasionally experience forces such as shock forces during vehicle operations from road conditions such as pot holes, from terrain features such as rocks and tree roots, from atmospheric conditions such as wind shear and turbulence and from water surface conditions such as chop. Some vehicles, such as, but not limited to, all terrain vehicles, have seat assemblies which lack a suspension or other shock absorption mechanism. The vehicle seat assemblies for such vehicles typically include a polyurethane or other foam cushion having a thickness that substantially exceeds the thickness of foam cushions used on vehicle seat assemblies that are equipped with suspensions or other mechanical shock absorption mechanisms.

The shock absorption capability of such thickened foam cushions may not be adequate or optimal for certain applications including all-terrain vehicles such as, but not limited to, four-by-fours, snowmobiles, and certain watercraft. Additionally, such thick cushioning may result in undesirable vehicle seat dimensions. It would be advantageous to provide a seat assembly for such vehicles having a lower profile and more desirable shock absorbency characteristics. The present invention addresses these issues.

SUMMARY OF THE INVENTION

Embodiments of a vehicle seat assembly are disclosed herein. In a first embodiment, a vehicle seat assembly for use with an all terrain vehicle that is designed for off-road travel is disclosed. The all terrain vehicle has a mounting surface for mounting the vehicle seat assembly. The vehicle seat assembly comprises a seat assembly that is adapted for mounting to the mounting surface. The seat assembly has a cushion composite having a structural layer comprising an expanded polymer and a cushion layer adjacent to the structural layer. The cushion composite further has a trim material secured over the cushion composite. A surface of the structural layer defines a cavity that extends partially into the structural layer. The structural layer and an opening to the cavity are disposed proximate the mounting surface when the seat assembly is mounted to the mounting surface and the cavity is configured to facilitate flexure of the structural layer when a force is applied to the structural layer.

In an implementation of the first embodiment, the structural layer comprises an expanded polyolefin.

In another implementation of the first embodiment, the cavity extends laterally along the structural layer for a predetermined length. In a variation of this implementation, a portion of the structural layer disposed above the cavity forms an arch. In an alternate variation, the cavity comprises a first cavity. The surface of the structural layer defines a second cavity that extends partially into the structural layer. An opening to the second cavity is disposed proximate the mounting surface when the seat assembly is mounted to the mounting surface. The second cavity is configured to facilitate flexure of the structural layer when a force is applied to the structural layer.

In a second embodiment, the vehicle seat assembly includes a cushion composite that is configured for attachment to a mounting surface of a vehicle. The cushion composite has a structural layer that comprises an expanded polymer and a cushion layer that is adjacent to the structural layer. The vehicle seat assembly also comprises a trim material that is secured over the cushion composite. In this embodiment, the structural layer is proximate to the mounting surface when the cushion composite is attached to the mounting surface. Also, a surface of the structural layer defines a cavity that extends partially into the structural layer. An opening to the cavity is disposed proximate the mounting surface when the cushion composite is attached to the mounting surface. The cavity is configured to facilitate flexure of the structural layer when a force is applied to the structural layer.

In an implementation of the second embodiment, the cavity extends longitudinally along the structural layer for a predetermined longitudinal length. In a variation of this implementation, the cavity extends longitudinally along the structural layer for substantially an entire longitudinal length of the structural layer.

In another implementation of the second embodiment, the cavity extends laterally along the structural layer for a predetermined lateral length. In a variation of this implementation, the cavity extends laterally along the structural layer for substantially an entire lateral length of the structural layer.

In another implementation of the second embodiment, the structural layer comprises an expanded polyolefin. In a variation of this implementation, the structural layer comprises expanded polypropylene.

In another implementation of the second embodiment, a portion of the structural layer that is disposed above the cavity forms an arch.

In another implementation of the second embodiment, portions of the structural layer that are adjacent the cavity are configured to move outwardly from the cavity along the mounting surface as the structural layer flexes in response to a load applied to the structural layer in a direction that is generally towards the mounting surface.

In another implementation of the second embodiment, the vehicle seat assembly further comprises a cushion member that is disposed within the cavity. The cushion member may be less rigid than the structural layer.

In another implementation of the second embodiment, the cavity comprises a first cavity. The surface of the structural layer defines a second cavity that extends partially into the structural layer. An opening to the second cavity is disposed proximate the mounting surface when the cushion composite is attached to the mounting surface and the second cavity is configured to facilitate flexure of the structural layer when a force is applied to the structural layer. In a variation of this implementation, the first cavity extends longitudinally along the structural layer for a predetermined longitudinal length. The second cavity extends longitudinally along the structural layer for a predetermined longitudinal length. The first cavity and the second cavity are substantially aligned with one another. In an alternative variation, the first cavity extends laterally along the structural layer for a predetermined lateral length. The second cavity extends laterally along the structural layer for a predetermined lateral length. The first cavity and the second cavity are substantially aligned with one another. In an alternative variation of this implementation, the first cavity extends laterally along the structural layer for a predetermined lateral length, the second layer extends longitudinally along the structural layer for a predetermined longitudinal length and the first cavity and the second cavity are substantially transverse to one another.

In a third embodiment, a vehicle seat assembly is disclosed. The vehicle seat assembly comprises a cushion composite that is configured for attachment to a mounting surface of a vehicle. The cushion composite has a structural layer that comprises an expanded polypropylene and a cushion layer that is adjacent to the structural layer. The vehicle seat assembly further comprises a trim material that is secured over the cushion composite. In this third embodiment, the structural layer is proximate the mounting surface when the cushion composite is attached to the mounting surface. A surface of the structural layer defines a first cavity that extends partially into the structural layer. A second cavity extends partially into the structural layer. A third cavity also extends partially into the structural layer. The openings to the first cavity, the second cavity and the third cavity are disposed proximate the mounting surface when the cushion composite is attached to the mounting surface. The first cavity, the second cavity and the third cavity are configured to facilitate flexure of the structural layer when a force is applied to the structural layer.

BRIEF DESCRIPTION OF THE DRAWINGS

The description herein makes reference to the accompanying drawings wherein like reference numerals refer to like parts throughout the several views, and in which:

FIG. 1 is a side elevational view illustrating an all terrain vehicle equipped with an embodiment of a vehicle seat assembly made in accordance with the teachings of the present invention;

FIG. 2 is a perspective view illustrating an embodiment of a structural layer for use with the vehicle seat assembly of FIG. 1;

FIG. 3A is a perspective view illustrating deformation of the structural layer of FIG. 2 during the application of a downwardly directed shock force;

FIG. 3B is a perspective view illustrating an alternate deformation of the structural layer of FIG. 2 during the application of a downwardly directed shock force;

FIG. 4 is a perspective view illustrating an alternate configuration of the structural layer of FIG. 2 during the application of a downwardly directly shock force; and FIGS. 5-9 are perspective views illustrating alternate embodiments of the structural layer of FIG. 2.

DETAILED DESCRIPTION OF THE PREFERRED EMBODIMENT(S)

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Some vehicles may experience jerky motion, jolts, and shock forces during operations. For instance, an aircraft may experience sudden wind shear, a watercraft may experience choppy surf, an all terrain vehicle may encounter obstacles including fallen branches, logs, rocks and tree roots and an automobile may experience sudden shock forces when it passes over a pothole or a speed bump. In many vehicles, the seat assembly is equipped with springs, shock absorption devices and other mechanisms that can soften the impact forces acting on an occupant by absorbing those forces and/or spreading the application of those forces over a longer period of time. In other vehicles, including, but not limited to, all terrain vehicles, the seat assembly is not equipped with springs or other mechanisms to absorb shock forces. In such vehicles, the shock or other high impact forces may be transmitted directly to a seat occupant without mitigation. Such unmitigated impact force may cause discomfort to the seat occupant. It is desirable in vehicles where the seat assemblies lack a mechanical damper or shock absorber to provide a cushion that can withstand the anticipated shock forces that the vehicle is likely to encounter and that can mitigate the transmission of those forces to the seat occupant.

In U.S. Pat. No. 7,585,030, which is hereby incorporated herein by reference in its entirety, a vehicle seat assembly having a composite cushion including a cushion layer and a structural layer is disclosed. The structural layer comprises an expanded polymer such as expanded polypropylene. The combination of a polyurethane cushion with an expanded polypropylene structural layer can absorb the shock forces discussed above better than traditional polyurethane cushions can alone. The expanded polypropylene compresses during application of shock force, but such compression is far less than that experienced by a conventional polyurethane cushion. The conventional polyurethane cushion coupled with an expanded polypropylene structural layer provides both comfort and ample levels of shock absorbency.

To further enhance the ability of such a composite cushion to absorb shock forces, cavities may be formed in the structural layer. Such cavities may extend partially into the structural layer and open to a mounting member or other mounting structure on the vehicle. Configured with a cavity or cavities, the composite cushion not only compresses in response to the application of shock force, but the cavity/cavities also provide the structural layer with a space or void into which the structural layer may move, deflect, or flex in response to a shock force. The structural layer's compression in response to shock force coupled with flexure of the structural layer provide greater shock absorbency characteristics than is provided by a cushion having only a conventional foam layer.

The structural layer can be any suitable structural foam material. In at least one embodiment, suitable structural materials will have a rigidity and/or density that is higher than conventional polyurethane foam. In at least one embodiment, suitable structural foam materials have a density of at least 1.75 pounds per cubic foot (pcf), and less than 7.0 pcf. In at least another embodiment, suitable structural foam materials will have a density of 2.0 to 4.0 pcf, and in yet other embodiments of 2.5 to 3.5 pcf. Density of the structural foam material can be measured in accordance with ASTM test method No. D3574.

In at least one embodiment, suitable structural materials will have a hardness of 150 to 250 N (Newtons), in at least another embodiment of 175 to 230 N, and in at least another embodiment of 190 to 215 N. Hardness can be measured by ASTM test method No. D3574 and at 25% compression or deflection. In at least one embodiment, suitable structural materials will have a compression strength of 20 to 100 psi, in at least another embodiment of 30 to 80, and in at least another embodiment of 35 to 65, as measured in accordance with ASTM test method No. D3574.

In at least one embodiment, the structural layer comprises a molded expanded polyolefin (EPO) layer. Suitable examples of expanded polyolefin (EPO) include, but are not necessarily limited to, expanded polyethylene (EPE), expanded polypropylene (EPP), expanded polybutylene (EPB), and copolymers of ethylene, propylene, butylene, 1,3-butadiene, and other olefin monomers, such as alpha-olefin monomers having from 5-18 carbon atoms, and/or cycloalkylene monomers such as cyclohexane, cyclopentene, cyclohexadiene, norbornene, and aromatic substituted olefins, such as styrene, alpha-methylstyrene, paramethylstyrene, and the like.

In at least one particular preferred embodiment, the EPO is expanded polypropylene (EPP) and its copolymers with ethylene, propylene and butylene. Any suitable EPP may be used, however in at least one embodiment, suitable EPP's include, but are not limited to, ARPRO® EPP available from JSP International and EPP available from SCA Packaging North America.

Expanded polyolefins can be prepared by a bead polymerization process in which relatively small uniform beads of polymer are produced, containing a gas which is later utilized to effect blowing during the molding process. The most commonly used gas is air although other gases including low boiling point liquids which produce gases at the molding temperatures may be used. Suitable gases include, but are not limited to air, nitrogen, carbon dioxide, pentene and the like.

While the structural layer can have any suitable size and configuration, in at least one embodiment, the structural layer has an average thickness of 5 to 100 mm, in other embodiments of 20 to 70 mm, and in yet other embodiments of 30 to 50 mm.

The cushion layer can comprise any suitable cushion material, such as a suitable resilient polymer. In at least one embodiment, suitable cushion materials will have a density of 1.5 to 4.5 pcf, in another embodiment of 2.0 to 3.75 pcf, and in yet other embodiments of 2.7 to 3.0 pcf. Density of the cushion material can be measured by ASTM test method No. D3574. In at least one embodiment, suitable cushion materials will have a hardness of 175 N (Newtons) to 400 N, in other embodiments of 225 to 350 N, and in yet other embodiments of 275 to 325 N. Hardness of the cushion material can be measured by ASTM test method No. D3574. In at least one embodiment, suitable cushion materials will have a hysteresis of 18 to 30 KPa, in another embodiments of 20 to 28 KPa, and in yet other embodiments of 23-26 KPa. Hysteresis of the cushion material can be measured by ASTM test method No. D3574.

In at least certain embodiments, the cushion material comprises conventional polyurethane foam, soy-based foam, silicone, thermoplastic olefins, thermoplastic urethanes, and/or natural oil-based expanded polyurethanes and the like. In at least one embodiment, because of its environmentally friendly nature, soy-based polyurethane is preferred. Soy-based polyurethane can be made with any suitable soy-based polyols, such as those available, but not necessarily limited to, from Bayer, Urethane Soy Systems, and Dow Chemical. Any suitable soy-based polyurethane may be used, however in at least one embodiment, suitable soy-based polyurethanes include, but are not necessarily limited to those available from Woodbridge Foam and Renosol. The cushion layer can be any suitable size and shape, however, in at least one embodiment, the cushion layer has an average thickness of 20 to 100 mm, and in at least another embodiment of 30 to 70 mm, and in still yet other embodiments of 40 to 60 mm.

A comfort pad may be added to the composite cushion above the cushion layer to provide an added measure of comfort. The comfort pad can comprise any suitable comfort layer or pad and can be made of any suitable material that provides good hand feel and soft resilience as the seat assembly is deflected during use. The comfort pad is optionally provided when the cushion layer has a density above 3.0 pcf, as measured according to ASTM test method No. D3574 and/or a hardness above 300 N, as measured according to ASTM test method No. D3574 at a compression of 25%. In at least one embodiment, the comfort pad comprises a sheet of relatively soft material, such as a low hardness foam or a pad of non-woven fibrous materials. While the comfort pad may have any suitable shape and size and configuration, in at least one embodiment, the comfort pad has an average thickness of 2 to 30 mm, in other embodiments of 5 to 20 mm, and in yet other embodiments of 8 to 15 mm.

In at least one embodiment, the comfort pad comprises a polyester or nylon non-woven fiber pad. In at least one embodiment, the comfort pad comprises a non-woven compressed fiber material that is compatible, i.e., a similar type of polymer, with the trim material. In at least one embodiment, the comfort pad of non-woven fibrous material comprises a thickness of 5 -15 mm and a wt. of 2 to 6 oz.

In at least another embodiment, the comfort pad comprises a sheet of foam having an average thickness of 8 to 20 mm. In at least one embodiment, the foam comfort pad has a density of 1.8 to 2.5 pcf, as measured according to ASTM test method No. D3574. In at least one embodiment, the foam comfort pad has a hardness of 5 to 12 N, as measured according to ASTM test method No. D3574 at a compression or deflection of 25%. In at least certain embodiments, the foam comfort pad can have an air permeability of above 2.0 cubic feet/minute and/or a compression set (75%) of no more than 20%.

It should be understood that the structural layer, the cushion layer and the comfort pad can have any suitable configuration, shape and size. A greater understanding of embodiments of the invention disclosed herein may be obtained through a review of the accompanying drawings and the detailed description set forth below.

With reference to FIG. 1, an all terrain vehicle 20 is illustrated. It should be understood that the teachings and embodiments of the present invention are not limited to use with all terrain vehicles, but may also be employed on other vehicles including, but not limited to, motorcycles, tractors, and snowmobiles. Additionally, the teachings and embodiments of the present invention may be used on vehicles that travel through/over medium other than land. For instance, the teachings of the present invention may be used with watercraft, aircraft and spacecraft. Furthermore, the teachings of the present invention may also be used in automobiles including, but not limited to, coupes, sedans, pickup trucks, sport utility vehicles, minivans, full size vans, convertibles, cross over utility vehicles, and buses.

All terrain vehicle 20 includes a mounting surface 22. Mounting surface 22 may be any surface or member on all terrain vehicle 20 configured to receive a seat assembly such as seat assembly 24. Mounting surface 22 lacks any structure or mechanism designed to absorb shock forces which would be transmitted from all terrain vehicle 20 to seat assembly 24 through mounting surface 22. Accordingly, the impact forces encountered by an occupant of vehicle seat assembly 24 may be exposed to substantial shock forces during operation of the vehicle. In vehicles that are equipped with shock absorption mechanisms, the shock forces encountered by such vehicles may, nevertheless, be at such a level that a seat occupant may experience jarring impacts during vehicle operations which, to be tolerable, may require a vehicle seat assembly with an enhanced capacity to absorb shock.

Vehicle seat assembly 24 includes a seat back for supporting the back of a passenger or vehicle operator. Vehicle seat assembly 24 also includes a composite cushion 28 on which a vehicle passenger or operator may be seated. Composite cushion 28 includes an outer trim layer 30, a cushion layer 32 and a structural layer 34. In some embodiments, a comfort layer may be included between the cushion layer 32 and the outer trim layer 30 to enhance an occupant's comfort. Trim layer 30 may be made of a material comprising leather, vinyl, cloth, or another material effective to serve as upholstery for composite cushion 28.

Structural layer 34 includes a surface 36 defining a cavity 38. Cavity 38 extends laterally across the entire width of structural layer 34. As used herein, the terms "lateral" and "laterally" refer to a direction that is transverse to the direction of vehicle travel in a horizontal plane. The terms "longitudinal" and "longitude" refer to the direction of vehicle travel. A vehicle occupant may sit on outer trim layer 30 in a position straddling all terrain vehicle 20. The vehicle occupant's posterior would be supported by the cushion layer 32 and, below that, structural layer 34. In this manner, structural layer 34, which is less rigid than mounting surface 22 and more rigid than cushion layer 32, is disposed in a position well-suited to buffer the vehicle occupant from jolts and jarring shock forces encountered during vehicle operations such as off-road activity.

With respect to FIG. 2, structural layer 34 is illustrated in perspective view. In this view, the laterally extending cavity 38 and surface 36 defining cavity 38 are clearly illustrated. When all terrain vehicle 20 encounters an obstacle, such as rock 21, all terrain vehicle 20 is abruptly thrust in an upward direction. From the perspective of structural layer 34, a shock force will be applied in a downward direction on an upper surface 40 of structural layer 34. This is caused by the inertia of the vehicle occupant's body as structural layer 34 moves upwardly. In response to the shock force, structural layer 34 will compress. Additionally, structural layer 34 will flex or deflect downwardly in response to the downwardly directed shock force.

With respect to FIG. 3A, the structural layer 34 is illustrated as a shock force SF is applied in a downward direction to upper portion 40. Structural layer 34 includes two legs 41, 42. In the embodiment illustrated in FIG. 2, braces 44 and 46 restrain legs 41 and 42 from extending longitudinally. In other embodiments, other structures or restraints may be employed to prevent lateral motion of legs 41, 42, including, but not limited to, staples, stitches and adhesives. Additionally, trim 30 may restrain legs 41 and 42 from lateral extension. As illustrated in FIG. 3, braces 44, 46 prevent longitudinal extension of legs 41 and 42. Because legs 41 and 42 cannot extend longitudinally, upper portion 40 of structural layer 34 deflects downwardly in response to the downwardly directed shock force. Surface 36 of structural layer 34 also deflects downwardly. The initial position of upper portion 40 and surface 36 are illustrated in phantom lines. The downward deflection of upper portion 40 and surface 36 assists structural layer 34 in absorbing shock force SF. Structural layer 34 acts as a spring to absorb the downwardly directed shock force SF. Structural layer 34 absorbs the energy as upper portion 40 deflects. The deflection of structural layer 34 extends the period of time over which the energy of shock force SF is absorbed. As a result, the vehicle occupant experiences a more gentle impact when the vehicle experiences jolts and shock forces.

With respect to FIG. 3B, an alternate deformation of structural layer 34 is illustrated. In FIG. 3B, rather than upper portion 40 of structural layer 34 deflecting downwardly, legs 41 and 42 bow outwardly in response to the application of shock force SF. In other embodiments, both legs 41, 42 and upper portion 40 may deflect, depending upon the dimensions of the material, the magnitude of the shock force SF, and the load acting on structural layer 34.

With respect to FIG. 4, an alternate configuration for mounting structural layer 34 is illustrated. In FIG. 4, braces 44 and 46 are positioned a predetermined distance from the original positions of legs 41 and 42 (illustrated in phantom lines). As shock force SF is applied in a downward direction to upper portion 40 of structural layer 34, legs 41 and 42 extend longitudinally toward respective braces 44 and 46 which prevent further longitudinal motion of legs 41 and 42. As legs 41 and 42 extend longitudinally, structural layer 34 again acts as a spring absorbing energy as legs 41 and 42 stretch in opposite directions. When legs 41 and 42 reach braces 44 and 46, respectively, if shock force SF has not been completely dissipated, then structural layer 34 would deflect further in the manner illustrated in FIGS. 3A and 3B.

With respect to FIG. 5, an alternate embodiment of structural layer 34 is illustrated. In FIG. 5, cavity 38 extends longitudinally along an entire length of structural layer 34.

With respect to FIG. 6, a second cushion 48 has been positioned within cavity 38. Second cushion 48 may comprise any foam material such as polyurethane or any expanded polymer such as expanded polypropylene. In embodiments where second cushion 48 comprises an expanded polymer, second cushion 48 may have a lower density than the expanded polymer comprising structural layer 34. In such embodiments, and also in embodiments where second cushion 48 comprises conventional foam, structural layer 34 may respond to a downwardly directed shock force in the manner depicted in FIGS. 3 and 4, with second cushion 48 buffering the deflection of structural layer 34. In other embodiments, second cushion 48 may comprise an expanded polymer or other material having a higher density and lesser compressibility than the material comprising structural layer 34. In such instances, composite cushion 28 may present a vehicle seat occupant with a layered cushion having increasing levels of resistance to compression.

With respect to FIG. 7, an alternate embodiment of structural layer 34 is illustrated. In this embodiment, cavity 38 does not extend completely to the outer ends of structural layer 34. Cavity 38 has been bored out of, or otherwise removed from, a solid structural layer 34. In other embodiments, structural layer 34 may be molded to include cavity 38. In the illustrated embodiment, cavity 38 is substantially rectangular. In other embodiments, cavity 38 may be domed shaped or have some other curvilinear configuration. Cavity 38 may have any suitable dimension. It may be relatively small with respect to the remainder of structural layer 34 or it may extend substantially into structural layer 34. In some embodiments, a plurality of cavities may be disposed along a bottom surface of structural layer 34. In embodiments having multiple cavities, each cavity may be positioned beneath anticipated areas of high pressure. For example, cavities may be positioned beneath the hip bones of a vehicle occupant or adjacent other high pressure points.

With respect to FIG. 8, an alternate embodiment of structural layer 34 is illustrated. In this embodiment, a second cavity 50 defined by surface 36 of structural layer 34 extends laterally across structural layer 34. As illustrated in FIG. 8, cavities 38 and 50 are each smaller than the cavity 38 depicted in FIGS. 2-4 and are substantially parallel with one another. In other embodiments, the two cavities may be oriented transversely to one another or may have any other desirable orientation. Configuring structural layer 34 to have two tandem cavities 38, 50 may be useful in circumstances where wider cushion designs are used. With wider cushion designs, it may be advantageous to have cavities aligned below the ischial bones of a seated occupant to manage energy dissipation. This configuration may also help tune the performance to the specific support structure or frame of the vehicle or to provide structural reinforcement with the center beam in wider applications or longer applications.

With respect to FIG. 9, a third embodiment of structural layer 34 is illustrated. In this embodiment, structural layer 34 has a first cavity 38, a second cavity 50 and a third cavity 52. In this embodiment, first cavity 38 is disposed laterally across structural layer 34 while second and third cavities 50, 52 extend longitudinally along structural layer 34 and substantially transverse to first cavity 38. Such an arrangement may be useful on all terrain vehicle 20 where first cavity 38 may be disposed along a forward part of composite cushion 28 to support a vehicle occupant's thighs while second and third cavities 50, 52 may each be positioned below the vehicle occupant's hip bones.

In FIGS. 1-6 and 8-9, cavity 38 has been illustrated as curvilinear and, more specifically, configured as an arch. It should be understood that any geometric configuration including rectilinear configurations may also be employed. It should also be understood that although FIGS. 1-6 and 8-9 illustrate cavity 38 extending completely from one side of structural layer 34 to the other, the teachings of the present invention apply with equal force to cavities that do not extend to the sides of structural layer 34. For instance, in some embodiments, cavity 38 may extend to only one side of structural layer 34. In still other embodiments, cavity 38 may be completely contained within structural layer 34 and may not open to any surface, including a bottom surface, of structural layer 34, essentially forming a bubble within structural layer 34.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly comprising:
   a cushion composite having a structural layer comprising expanded polypropylene and a cushion layer comprising a polymer and disposed adjacent to the structural layer; and
   a trim material secured over the cushion composite;
   wherein a surface of the structural layer defines a first cavity extending laterally across the structural layer, a second cavity extending substantially transverse to the first cavity such that the second cavity extends from an end of the structural layer toward the first cavity, and a third cavity extending substantially transverse to the first cavity such that the third cavity extends from the end of the structural layer toward the first cavity and substantially parallel to the second cavity;
   wherein the second and third cavities are spaced apart from each other and spaced apart from the first cavity; and
   wherein the first cavity, the second cavity and the third cavity are configured to facilitate flexure of the structural layer when a force is applied to the structural layer.

* * * * *